United States Patent

[11] 3,599,84[?]

| [72] | Inventor | Benjamin H. Dickson<br>P.O. Box 43, Yuma, Colo. 80759 |
|---|---|---|
| [21] | Appl. No. | 843,542 |
| [22] | Filed | July 22, 1969 |
| [45] | Patented | Aug. 17, 1971 |

[54] STRAW AND CHAFF SAVER OR BUNCHER
4 Claims, 3 Drawing Figs.

[52] U.S. Cl. .................................................. 222/508,
177/112, 198/39, 214/463, 239/651, 298/26
[51] Int. Cl. ......................................................... G01g 13/06
[50] Field of Search .......................................... 222/77,
177, 505, 508; 239/651, 668; 214/425, 463;
296/61; 298/26; 177/111, 112; 198/39

[56] References Cited
UNITED STATES PATENTS

| 2,466,386 | 4/1949 | Curioni | 198/39 |
| 3,168,224 | 2/1965 | Rios | 222/463 |
| 3,254,729 | 6/1966 | Behlen | 177/111 |
| 3,351,384 | 11/1967 | Huck | 298/2[?] |

*Primary Examiner*—M. Henson Wood, Jr.
*Assistant Examiner*—Michael Y. Mar

ABSTRACT: An attachment for a harvester combine, the a[?] tachment comprising a basket having a downwardly pivotab[?] floor attached to counter weighed linkages for the purpose [?] dispensing bunches of straw and chaff collected within th[?] basket.

PATENTED AUG 17 1971 3,599,844
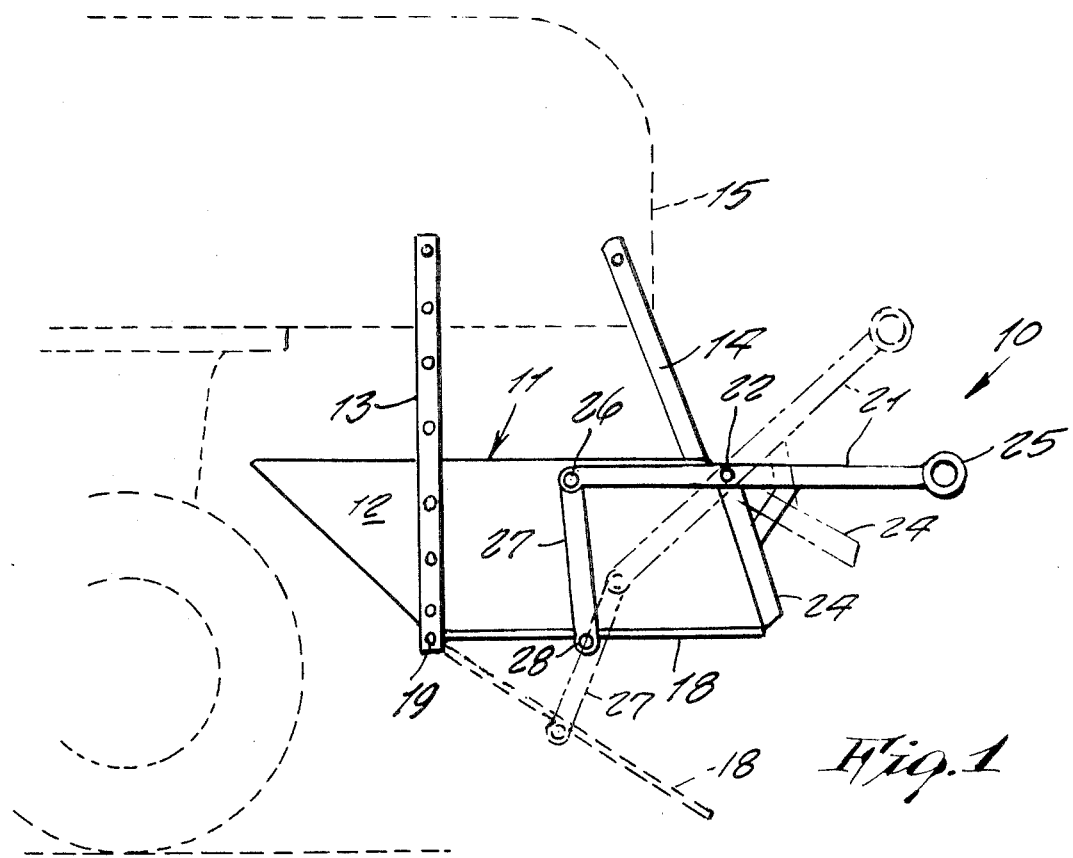
Fig.1
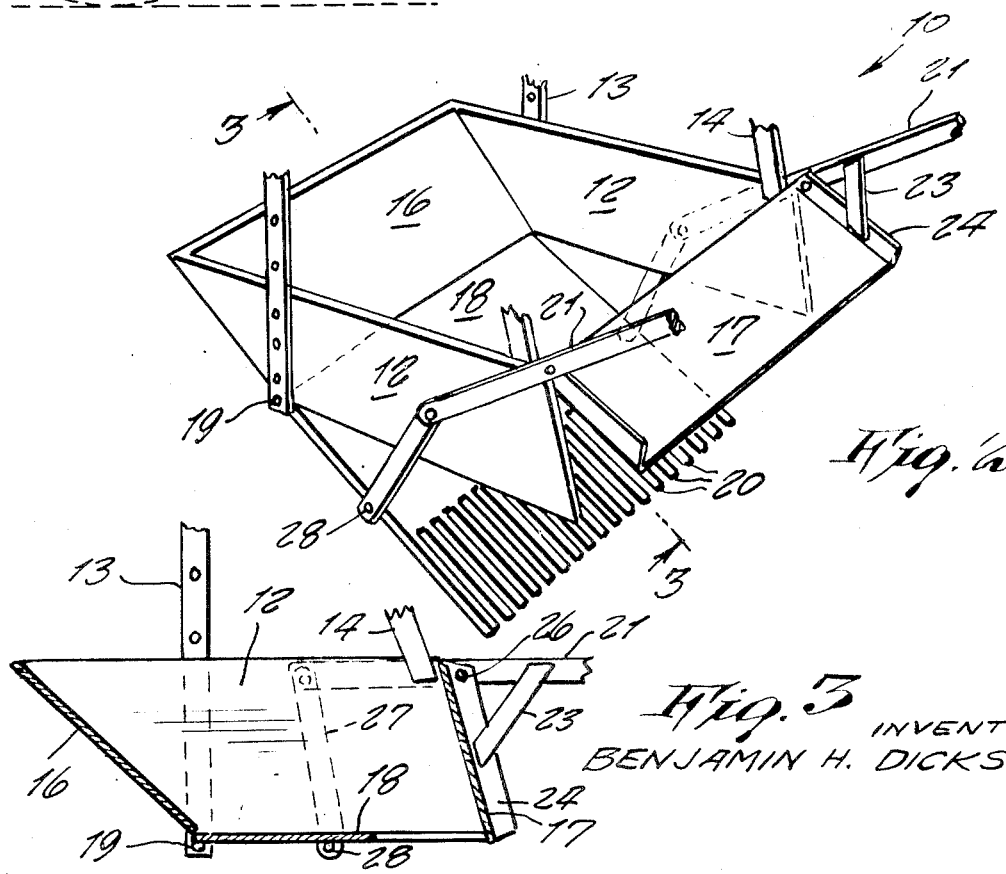
Fig.2
Fig.3
INVENTOR
BENJAMIN H. DICKSON

STRAW AND CHAFF SAVER OR BUNCHER

This invention relates generally to agricultural appliances.

A principle object of the present invention is to provide an attachment to a harvester combine, the attachment comprising a straw buncher and chaff saver.

Another object of the present invention is to provide a straw and chaff saver which will receive the straw and chaff discharged from a combine and place it in small bunches or piles discharged from the device.

Another object of the present invention is to provide a straw saver wherein the size of the bunches or piles is controlled by sliding weights upon the end of linkages connected to a downwardly pivotable bottom floor of a basket comprising the present device.

Yet another object of the present device is to provide a straw and chaff saver for collecting the same which is valuable for feeding of stock.

Other objects of the present invention are to provide a straw and chaff saver which is simple in design, inexpensive to manufacture, rugged in construction, easy to use and efficient in operation.

These and other objects will be readily evident upon a study of the following specification and the accompanying drawing wherein:

FIG. 1 is a side elevation view of the present invention shown mounted upon a harvester combine, FIG. 2 is a perspective view of the present invention shown per se, and FIG. 3 is a cross-sectional view taken on the line 3-3 of FIG. 2 and showing the device in a closed position.

Referring now to the drawing in detail, the reference numeral 10 represents a straw and chaff saver according to the present invention, wherein there is a basket 11 which may be of any of different shapes such as square, rectangular, trapezoidal, or any other combination of shapes. The basket includes opposite sidewalls 12 which are secured by means of metal straps or bars 13 and 14 to a harvester combine 15, as shown in FIG. 1 of the drawing.

The basket 11 includes inclined forward wall 16 rigidly affixed relative to the sidewalls 12 and a rear wall 17. The basket further includes a bottom floor 18 which is pivotable about a pin 19 at the lower end of strap 13, the floor 18 being downwardly pivotable at the same time that the rear wall 17 is rearwardly upwardly pivotable. The floor 18 may be provided with or without a plurality of fingers 20 shown in FIG. 2 of the drawing, as preferred by a manufacturer.

A pair of bars 21 are centrally pivotable about pins 22 supported in the sidewalls 12, the bars 21 being rigidly fastened to the rear wall 17 by means of a diagonally extending brace 23 secured at one end to the bar 21 and at its opposite end to a flange 24 integral with the rear wall 17. It will, of course, be understood that the rear wall 17 can readily termed as a tailgate of the device in view of its pivotable movement. The one end of the bars 21 support a plurality of weights 25 which are adjustably positioned thereupon so as to vary the pivotable force upon the bars 21. The opposite of the bars 21 are connected by means of pins 26 to one end of a pair of links 27 located upon opposite outer sides of the basket 11, the opposite ends of the links 27 being connected to pins 28 secured to the underside of the floor 18. The pins 22 of the bars 21 must be made rigid to stabilize the action of floor 18 so it will not twist. The pins 22 can accordingly be in one piece clear across or make the weight in one piece.

In operative use, straw and chaff are collected in the basket during normal operation of the harvester combine, when a sufficient quantity thereof is contained within the basket 11, the straw and chaff will be heavier than the counter weight 25 thereby causing the bars 21 to pivot about the pins 22 thus causing floor 18 to pivot downwardly about the pins 19 and at the same time cause the tailgate or rear wall 17 to move to a rearwardly and upwardly position, thus allowing the straw and chaff to be conveniently dispensed outwardly of the basket.

Provision will be made for the scale weights to slide back and forth or adjust for different sizes of straw bunches and chaff, as desired to suit the particular farmer.

What I now claim is:

1. In a straw and chaff saver for attachment to a harvester combine, the combination of a basket, strap means for securement of said basket to said harvester combine, said basket including a means for collection of straw and chaff, and said basket having self-contained means for dispensing of said straw and chaff upon attainment of a predetermined amount thereof, said basket comprising a container including a pair of spaced-apart sidewalls, said sidewalls being rigidly affixed to a lower end of the said straps which at their upper ends are secured to said harvester combine, a front wall between the front edges of said sidewalls, a bottom floor and a rear wall said bottom floor being pivotable along a forward edge about pins in the lower edge of said strap in alignment with a lower edge of said front wall, and said bottom floor being pivotable by counterweight means.

2. The combination as set forth in claim 1, wherein said counterweight means comprises a pair of bars centrally pivotable about pins mounted along a rear upper portion of said sidewalls, one end of said bars supporting a plurality of adjustable counterweights, the opposite end of said bars being connected by means of pins to a pair of links, the opposite ends of said links each being connected to a pin secured to the underside of said bottom floor.

3. The combination as set forth in claim 2, wherein each of said bars is rigidly affixed to said rear wall, said rear wall being pivotable about a pair of pins on which aid bars are centrally pivotable, a diagonal brace rigidly affixed at one end to each said bar, the opposite end of each said brace being rigidly affixed to a flange integral with a side edge of said rear wall, whereby pivotal movement of said rear wall constitutes the same to comprises a tailgate of said basket.

4. The combination as set forth in claim 3, wherein said bottom floor is provided with a plurality of parallel extending flanges along a rear edge thereof.